United States Patent
Lucas et al.

(10) Patent No.: US 10,693,157 B2
(45) Date of Patent: Jun. 23, 2020

(54) HUMIDIFIER WITH AN INTEGRATED WATER SEPARATOR FOR A FUEL CELL SYSTEM, FUEL CELL SYSTEM INCLUDING A HUMIDIFIER, AND VEHICLE INCLUDING SAME

(71) Applicant: Volkswagen AG, Wolfsburg (DE)

(72) Inventors: Christian Lucas, Braunschweig (DE); Rune Staeck, Gifthorn (DE)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 412 days.

(21) Appl. No.: 15/376,509

(22) Filed: Dec. 12, 2016

(65) Prior Publication Data

US 2017/0179505 A1 Jun. 22, 2017

(30) Foreign Application Priority Data

Dec. 17, 2015 (DE) .................. 10 2015 122 115

(51) Int. Cl.
*H01M 8/04119* (2016.01)
*H01M 8/04089* (2016.01)
*H01M 8/1018* (2016.01)

(52) U.S. Cl.
CPC ... *H01M 8/04141* (2013.01); *H01M 8/04149* (2013.01); *H01M 8/04164* (2013.01); *H01M 8/04097* (2013.01); *H01M 8/04126* (2013.01); *H01M 8/04134* (2013.01); *H01M 8/04156* (2013.01); *H01M 8/04171* (2013.01); *H01M 2008/1095* (2013.01); *H01M 2250/20* (2013.01); *Y02T 90/32* (2013.01)

(58) Field of Classification Search
CPC ..... H01M 2008/1095; H01M 2250/20; H01M 8/04097; H01M 8/04141; H01M 8/04149; H01M 8/04164; H01M 8/04126; H01M 8/04134; H01M 8/04156; H01M 8/04171; Y02T 90/32; B01F 3/04007; B01F 3/04085; F24F 6/43; F24F 2006/008
USPC .................. 261/104, 97, 110, 107
See application file for complete search history.

(56) References Cited

U.S. PATENT DOCUMENTS 6,294,045 B1 * 9/2001 Hidaka .................. A61K 9/703
156/327
6,953,635 B2 10/2005 Suzuki et al.
7,582,143 B2 9/2009 Berger et al.
(Continued)

FOREIGN PATENT DOCUMENTS

DE 10 2004 022 312 A1 9/2005
DE 10 2004 022 245 A1 12/2005
(Continued)

*Primary Examiner* — Robert S Jones
*Assistant Examiner* — Rachel L Zhang
(74) *Attorney, Agent, or Firm* — Davidson, Davidson & Kappel, LLC (57) ABSTRACT

A humidifier with an integrated water separator for a fuel cell system, including a housing with a first channel for a first gas stream and a second channel for a second gas stream, a humidifier area in which the first channel and the second channel are separated from one another by a water vapor-permeable membrane, and a collection container for collecting the deposited liquid water is provided. It is provided that a water separator for separating liquid water is situated in the humidifier area.

20 Claims, 3 Drawing Sheets

(56) References Cited

U.S. PATENT DOCUMENTS

| | | | | |
|---|---|---|---|---|
| 8,163,243 B1* | 4/2012 | Burke | ............... | B01D 5/0015 422/120 |
| 2008/0217795 A1* | 9/2008 | Gofer | ............... | H01M 8/04141 261/104 |
| 2014/0227618 A1 | 8/2014 | Handgraetinger et al. | | |
| 2014/0260398 A1* | 9/2014 | Kozubal | ............... | F25B 15/00 62/271 |
| 2015/0004504 A1* | 1/2015 | Bardeleben | ............... | B01D 53/265 429/413 |
| 2018/0370336 A1* | 12/2018 | Lucas | ............... | H01M 8/0289 |

FOREIGN PATENT DOCUMENTS

| | | |
|---|---|---|
| DE | 102012014611 | 1/2014 |
| DE | 10 2012 018 863 A1 | 3/2014 |
| WO | WO 02013/026514 A1 | 2/2013 |

* cited by examiner

HUMIDIFIER WITH AN INTEGRATED WATER SEPARATOR FOR A FUEL CELL SYSTEM, FUEL CELL SYSTEM INCLUDING A HUMIDIFIER, AND VEHICLE INCLUDING SAME

This claims the benefit DE102015122115.2, filed Dec. 17, 2015 and hereby incorporated by reference herein.

The present invention relates to a humidifier with an integrated water separator for a fuel cell system, and a fuel cell system which includes a humidifier with an integrated water separator. Moreover, the present invention relates to a vehicle which includes such a humidifier and such a fuel cell system.

BACKGROUND

Fuel cells utilize the chemical reaction of a fuel with oxygen to form water in order to generate electrical energy. For this purpose, fuel cells contain as a key component the so-called membrane electrode assembly (MEA), which is a structure made up of an ion-conducting (usually proton-conducting) membrane and a catalytic electrode (anode and cathode) respectively situated on each side of the membrane. The anode and cathode generally include supported noble metals, in particular platinum. In addition, gas diffusion layers (GDL) may be situated on both sides of the membrane electrode assembly, on the sides of the electrodes facing away from the membrane. The fuel cell is generally formed by a plurality of MEAs situated in the stack whose electrical power is additive. Bipolar plates (also referred to as flow field or separator plates), which ensure that the single cells are supplied with the operating media, i.e., the reactants, and which are often also used for cooling, are generally situated between the individual membrane electrode assemblies. In addition, the bipolar plates ensure an electrically conductive contact with the membrane electrode assemblies.

During operation of the fuel cell, the fuel (anode operating medium), in particular hydrogen $H_2$ or a hydrogen-containing gas mixture, is supplied to the anode via a flow field, open on the anode side, of the bipolar plate, where an electrochemical oxidation of ($H_2$) to form protons ($H^+$) takes place with release of electrons ($H_2 \rightarrow 2\ H^+ + 2\ e^-$). (Water-bound or water-free) transport of the protons from the anode chamber into the cathode chamber takes place via the electrolyte or the membrane which separates in a gas-tight manner and electrically insulates the reaction chambers from one another. The electrons provided at the anode are supplied to the cathode via an electrical line. The cathode is supplied with oxygen or an oxygen-containing gas mixture (air, for example) as cathode operating medium via a flow field of the bipolar plate which is open on the cathode side, so that a reduction of $O_2$ to $O^{2-}$ takes place with acceptance of the electrons ($\frac{1}{2}\ O_2 + 2\ e^- \rightarrow O^{2-}$). At the same time, in the cathode chamber the oxygen anions react with the protons which are transported across the membrane, forming water ($O^{2-} + 2\ H\ 4\ H_2O$).

To ensure the ion conductivity of the electrolytes or the membranes of the MEA, they must generally be constantly moistened. For this purpose, a humidifier is integrated into an anode/cathode exhaust gas path and into an anode/cathode supply path of the fuel cell in order to withdraw moisture from the water-containing fuel cell exhaust gases and supply this moisture to the freshly supplied operating media. Water vapor-permeable membranes which allow transfer of moisture but prevent mixing of the exhaust gases with the fresh operating media are generally used for this purpose.

The anode/cathode exhaust gas path of the fuel cell system may also include a turbine in order to recover energy, for example for driving a compressor in the anode/cathode supply path, by expansion of the exhaust gases. This turbine may be damaged by liquid water contained in the exhaust gas or by condensate formation. For this reason, the turbine is generally situated in the exhaust gas line downstream from the humidifier and optionally downstream from additional water separators. Various relative configurations of the humidifier and water separators are known from the prior art.

DE 10 2004 022 245 A1 and DE 10 2004 022 312 A1 describe a moisture exchange module which includes a bundle of hollow fiber membranes that are permeable to moisture, and a supply line for a gas stream which flows through the hollow fiber membranes, means for separating liquid particles in the gas flow being provided in the area between the supply line and the membrane bundle.

WO 2013/026514 A1 and DE 10 2012 018 863 A1 describe a gas/gas humidification device through which an operating medium stream, which flows to a fuel cell, and an exhaust gas stream, which flows from the fuel cell, flow, and which are separated by a water vapor-permeable membrane inside the humidification device. The gas/gas humidification device also includes an integrated water separator which is integrated downstream from the membranes in the flow direction of the moist exhaust gases.

U.S. Pat. No. 6,953,635 B2 describes a humidifier for a fuel cell which includes a plurality of water vapor-permeable hollow fiber membranes situated in a housing, through which a moist fuel cell exhaust gas flows and around which a dry fuel cell operating gas flows. The housing includes integrated water separators that are situated in a supply line area of the exhaust gas and/or in a discharge area of the operating gas.

SUMMARY OF THE INVENTION

These known relative configurations of the humidifier and water separators are disadvantageous in several respects. A water separator situated upstream from the humidifier may greatly dry out the exhaust gas stream and cool it due to condensate formation, resulting in insufficient humidification of the operating media in the subsequent humidifier. When the water separator is situated downstream from the humidifier in the exhaust gas flow direction, there is a risk that liquid droplets contained in the exhaust gas may impair the functionality of the humidifier membranes. Although the functioning of water separators situated on each side of a humidifier may generally be well controlled, such an arrangement takes up much installation space.

It is an object of the present invention to provide a humidifier for a fuel cell system which at least partially overcomes the disadvantages of the prior art and allows a well-controllable moisture exchange between the exhaust gas stream and the operating medium stream of a fuel cell, while at the same time allowing a compact design. In addition, it is intended that the humidifier has a preferably simple construction, is cost-effective to manufacture, and ensures sustainable operation.

The present invention provides a humidifier with an integrated water separator for a fuel cell system, a fuel cell system which includes a humidifier with an integrated water separator, and a vehicle which includes such a fuel cell system.

The humidifier with an integrated water separator for a fuel cell system according to the present invention includes a housing with a first channel for a first gas stream and with a second channel for a second gas stream. The humidifier includes a humidifier area in which the first channel and the second channel are separated from one another by a water vapor-permeable membrane. The humidifier includes a water separator, situated in the humidifier area, for separating liquid water, and also includes a collection container for collecting the deposited liquid water.

In one specific embodiment, the first channel and the second channel are designed in such a way that the first gas stream and the second gas stream do not mix within the housing. The first gas stream is preferably a gas that is comparably moist in relation to the second gas stream, i.e., a gas having a relatively high content of gaseous and/or liquid water, and the second gas stream is a gas that is comparably dry in relation to the first gas stream, i.e., a gas having a relatively low content of gaseous and/or liquid water. In one specific embodiment, the humidifier area is designed in such a way that water vapor from the first gas stream passes into the second gas stream through the water vapor-permeable membrane.

Providing a water separator in the humidifier area of the humidifier, in which the water vapor-permeable membranes for transferring moisture from the fuel cell exhaust gases to the fuel cell operating gases are also situated, allows a particularly compact design of the humidifier and improves the functioning of the humidifier area. The humidifier according to the present invention ensures consistent humidification of the fuel cell operating gas, even under fluctuating operating conditions of the fuel cell, and reliably provides a turbine situated in the exhaust gas stream downstream from the humidifier with an exhaust gas stream that is largely free of droplets. The humidifier according to the present invention has an enhanced degree of integration.

According to one specific embodiment of the present invention, the water vapor-permeable membrane and/or the separator protrude(s) into the collection container, so that the membrane and/or the separator are/is partially immersed in the collected liquid water. A wicking effect is thus achieved via which water is drawn out of the collection container, and wetting of the membrane in the humidifier area is achieved.

In another specific embodiment of the present invention, the humidifier with an integrated water separator for a fuel cell system includes a housing with a first channel for a first gas stream and with a second channel for a second gas stream, whereby the first gas stream and the second gas stream do not mix within the housing. The humidifier includes a humidifier area in which the first channel and the second channel are separated from one another by a water vapor-permeable membrane, through which water vapor passes from the first gas stream into the second gas stream. A water separator for separating liquid water in the first channel is situated in the humidifier area of the humidifier, and is designed in such a way that liquid water is deposited from the first gas stream onto the water separator. Liquid water from the first gas stream is deposited onto the water separator within the first channel. The humidifier also includes a collection container for collecting the deposited liquid water, the collection container being situated in the humidifier area and being connected to the first channel.

In one specific embodiment, the water separator is situated only in the first channel in the humidifier area. This means that the water separator is not situated in the second channel, and is designed in such a way that no liquid water is deposited from the second gas stream onto the water separator. In one specific embodiment, the collection container is connected only to the first channel, and not to the second channel. This means that the collection container is connected to the first channel in such a way that liquids and gases may be exchanged between the first channel and the collection container. A direct exchange of liquids and gases between the collection container and the second channel does not take place.

Providing a water separator in the first channel and in the humidifier area of the humidifier allows the reliable separation of liquid components contained in the first gas stream. The arrangement of a collection container, connected to the first channel, for the deposited liquid water in the humidifier area allows improved humidification of a fuel cell operating gas. The liquid water deposited onto the water separator in the first channel passes into the collection container connected to the first channel. The liquid water which collects in the collection container is in contact with the first channel, and thus with the first gas stream which flows through the first channel. The liquid water situated in the collection container thus has an influence on the partial pressure or the vapor pressure of the water in the first gas stream in the first channel. By situating the water separator in the first channel and connecting the first channel to the collection container, in addition a large exchange surface is provided between the first gas stream and the deposited liquid water.

In another specific embodiment, the humidifier with an integrated water separator for a fuel cell system includes a collection container for collecting the liquid water deposited on the water separator, the collection container being situated in the humidifier area and being connected to the first channel. The water separator and/or the water vapor-permeable membrane preferably protrude(s) into the collection container. In other words, the water separator and/or the water vapor-permeable membrane have/has at least one extension which extends up to the volume of the collection container. In one specific embodiment, the water separator and/or the water vapor-permeable membrane extend(s) far enough into the collection container that, during operation of the humidifier, the water separator and/or the membrane extend(s), at least intermittently, into the liquid water that is collected in the collection container, i.e., are/is at least partially immersed in the collected liquid water. The membrane may be kept at least partly moist in this way. In addition, liquid may spread onto or within the water separator, for example in order to humidify the water vapor-permeable membranes or the first gas stream, preferably by the evaporation of liquid at the surface of the water separator.

In another specific embodiment of the humidifier with an integrated water separator, the water separator has a wicking effect. Within the scope of the present patent application, the wicking effect of the water separator is understood to mean that the water separator is designed in such a way that directed liquid transport may take place through its volume and/or along its surface, whereby the transport cannot be attributed solely to the action of gravity, or does not even take place against the force of gravity. The wicking effect may be based on capillary forces generated by the water separator, or the surface tension of the liquid, and/or a chemical interaction of the liquid with the surface of the water separator. The wicking effect may be created by the material of the water separator itself, in particular the water vapor-permeable membrane, for example as capillarity, or by a coating, for example a hydrophilic coating, applied to the water separator.

Providing a water separator having a wicking effect in a humidifier area of a humidifier on the one hand allows improved separation of liquid water from the first gas stream. On the other hand, the wicking effect of the water separator results in liquid water spreading out from the collection container along the water separator, against the force of gravity, in particular when the water separator extends into the collection container or into liquid water that is collected therein. The wicking effect thus allows improved deposition of liquid from the first gas stream in the first channel of the humidifier area onto the water separator, and allows evaporation of deposited liquid from the collection container on the water separator.

In another specific embodiment of the humidifier with an integrated water separator, wick structures situated in the first channel extend into the collection container. During operation of the humidifier, the wick structures extend, at least intermittently, into the liquid water that is collected in the collection container. The wick structures are provided, in addition to the water separator, in the humidifier area of the humidifier, and have a wicking effect as described above. The wick structures are preferably provided in addition to a water separator having a wicking effect. The wick structures are likewise preferably made of a material having a wicking effect, such as a textile filamentous mesh, or include a coating, with a wicking effect, on a carrier material without a wicking effect. With regard to the wicking effect, the wick structures have the same effect as a water separator with a wicking effect.

In various specific embodiments, the water separator is designed at least as a knitted fabric, a netting, or a mesh, a wire mesh or a wire lattice, or a perforated sheet. The water separator is situated in such a way that a gas stream, preferably the first gas stream, must flow through and around elements of the water separator. As a result, liquid droplets contained in the gas stream impinge on elements of the water separator due to centrifugal forces, adhere to same, and preferably trickle along the water separator into the collection container. The water separator is thus designed as at least one deflection means for the gas stream, in particular the first gas stream, in order to achieve an impingement effect.

In various specific embodiments, multiple water separators are situated in succession in the flow direction of the gas stream in order to effectuate multiple deflections of the gas stream. In this way, or by using a plurality of alternative deflection means, for example baffle plates, in further specific embodiments the water separator is designed as a labyrinth separator or plate separator. In one specific embodiment, the water separator includes at least one collection pocket which is situated in the channel and closed downstream. Such a collection pocket is preferably provided in an area in which liquid droplets transported in the gas stream are transported by centrifugal forces.

In another specific embodiment, the water separator includes means for generating a turbulent flow, similar to a cyclone. Strong centrifugal forces are generated by means for creating a turbulent flow in a gas stream, preferably in the first gas stream. The centrifugal forces cause liquid droplets contained in the gas stream to impact on a wall of the humidifier area or on an element of the water separator. The adherence of the liquid droplets to the wall or to the element may be improved by grooves introduced therein. In further specific embodiments, deposition of liquid water from the first gas stream is alternatively or additionally effectuated or improved by suitable temperature control or a wicking effect of the water separator.

Use of these types of water separators allows active deposition of liquid components of the first gas stream in the humidifier area of a humidifier. This goes well beyond passive deposition due to condensate formation in the humidifier. A turbine situated in the exhaust gas path of a fuel cell downstream from the humidifier is thus supplied with a dry exhaust gas stream. Damage to the turbine due to condensate formation is thus largely avoided. In addition, use of the water separators described herein allows collection of the deposited liquid water in a collection container, and evaporation of the deposited liquid water at the surfaces of the water separator. In this way, the water vapor portion, i.e., the portion of gaseous water, in the first gas stream may be homogenized, and the humidification of the second gas stream may thus be improved.

In one specific embodiment, the humidifier with an integrated water separator for a fuel cell system includes a housing with a first channel for a first gas stream and with a second channel for a second gas stream. In a humidifier area, a water vapor-permeable membrane in the form of at least one water vapor-permeable hollow fiber is situated in the first channel, so that the first gas stream flows around the at least one hollow fiber. Each hollow fiber has a hollow fiber space, the second gas stream flowing through the at least one hollow fiber space in the at least one hollow fiber, thus forming at least one second channel. The first gas stream preferably flows in parallel, antiparallel, or transversely with respect to the hollow fibers. A water separator for separating liquid water is situated in the humidifier area, preferably in the first channel in the humidifier area. In addition, a collection container in which the deposited liquid water collects and which is preferably connected to the first channel is situated in the humidifier area.

In another specific embodiment, the humidifier with an integrated water separator for a fuel cell system includes a housing with a first channel for a first gas stream and with a second channel for a second gas stream. In a humidifier area, the first channel and the second channel are separated from one another by at least one water vapor-permeable plate membrane. Multiple plate membranes are preferably situated essentially plane-parallel with respect to one another in the humidifier area, each plate membrane being situated between one portion of the first gas stream and one portion of the second gas stream. The first channel is thus divided into a plurality of first channels, and the second channel is divided into a plurality of second channels. The first and second channels are preferably situated essentially in parallel to one another, and alternating in succession in the humidifier area of the humidifier. It is likewise preferred that the first gas stream and the second gas stream flow in parallel or antiparallel through the first and second channels. A water separator for separating liquid water is situated in the humidifier area, preferably in the first channel, or in each of the plurality of first channels. A collection container for collecting the deposited liquid water is situated in the humidifier area, and is preferably connected to the first channel, or to each of the plurality of first channels.

In another specific embodiment, the water separator is formed by a coating on the at least one plate membrane, preferably on the side of a plate membrane facing the first channel or one of the plurality of first channels. In one specific embodiment, the coating creates a structuring of at least one surface of the at least one plate membrane, for example in the form of a plurality of grooves or in the form of a greatly roughened surface. It is likewise preferred for the coating to be applied over the entire surface of at least one side of the plate membrane. Additionally or alternatively, the coating is made of a material which facilitates the water separation, for example a hydrophilic material. In one specific embodiment, the at least one plate membrane is oriented in such a way that the deposited liquid water trickles along the plate membrane into the collection container.

In another specific embodiment, the humidifier with an integrated water separator for a fuel cell system includes a housing with a first channel for a first gas stream and with a second channel for a second gas stream, a humidifier area in which the first channel and the second channel are separated from one another by a water vapor-permeable membrane, a water separator, situated in the humidifier area, for separating liquid water, and a collection container which is situated in the humidifier area and in which the deposited liquid water collects. The collection container has a discharge opening for the deposited liquid water, the discharge opening being designed as an overflow and/or a regulatable or controllable discharge valve. This allows setting of the quantity of deposited liquid water which is connected to the first gas stream, and thus, setting of the vapor pressure above the collection container, or the water vapor partial pressure of the first gas stream in the first channel.

In another specific embodiment, the humidifier with an integrated water separator for a fuel cell system includes a housing with a first channel for a first gas stream and with a second channel for a second gas stream. The first channel includes a first gas supply line and a first gas discharge line that are situated in an anode/cathode exhaust gas path of a fuel cell system. The second channel includes a second gas supply line and a second gas discharge line that are situated in an anode/cathode supply path of a fuel cell system. The first gas stream is an anode/cathode exhaust gas stream, and the second gas stream is an anode/cathode operating gas stream. The humidifier includes a humidifier area in which the first channel and the second channel are separated from one another by a water vapor-permeable membrane. A water separator for separating liquid water and a collection container in which the deposited liquid water collects are situated in the humidifier area. In one preferred specific embodiment, the first and the second gas supply line and the first and the second gas discharge line are situated in such a way that the first gas stream and the second gas stream in the humidifier area of the humidifier are led toward one another as crossflows or as counterflows.

Unless stated otherwise in the individual case, the various specific embodiments of the present invention described in the present patent application are advantageously combinable with one another.

A further aspect of the present invention relates to a fuel cell system which includes a humidifier with an integrated water separator according to the present invention. In particular, the fuel cell system includes a fuel cell stack, an anode supply with an anode supply path for supplying an anode operating medium to the fuel cell stack, and with an anode exhaust gas path for discharging an anode exhaust gas from the fuel cell stack, a cathode supply with a cathode supply path for supplying a cathode operating medium to the fuel cell stack, and with a cathode exhaust gas path for discharging a cathode exhaust gas from the fuel cell stack, and a humidifier with an integrated water separator situated in the anode supply and/or the cathode supply.

A further aspect of the present invention relates to a vehicle which includes a humidifier with an integrated water separator according to the present invention and/or a fuel cell system according to the present invention. The vehicle is preferably an electric vehicle in which electrical energy generated by the fuel cell system is used to supply an electric traction motor and/or a traction battery.

BRIEF DESCRIPTION OF THE DRAWINGS

The present invention is explained below in exemplary embodiments with reference to the appended drawings.

DETAILED DESCRIPTION

Figure 1:
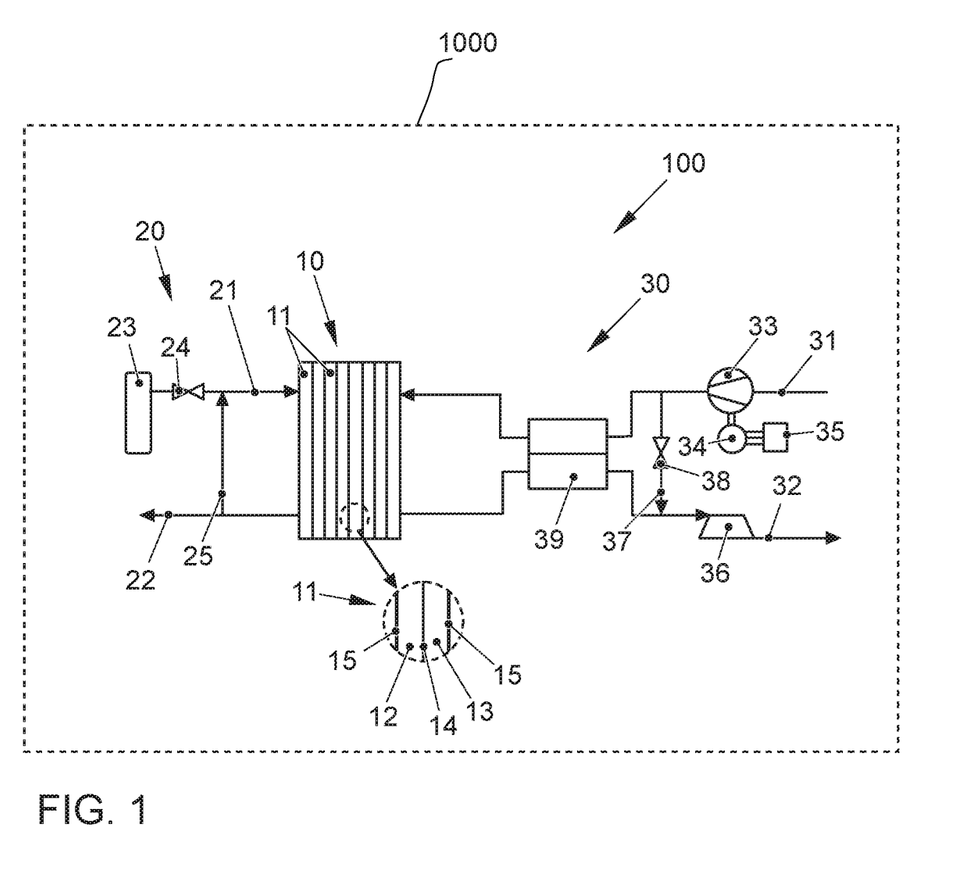
FIG. 1 shows a block diagram of a fuel cell system according to one preferred embodiment.

FIG. 1 shows a fuel cell system, denoted overall by reference numeral 100, according to one preferred embodiment of the present invention. Fuel cell system 100 is part of a vehicle 1000 shown schematically, in particular an electric vehicle, which includes an electric traction motor that is supplied with electrical energy by fuel cell system 100.

Fuel cell system 100 includes as a core component a fuel cell stack 10 which includes a plurality of stacked single cells 11 which are formed by membrane electrode assemblies (MEA) 14 and bipolar plates 15 stacked in alternation. Each single cell 11 thus includes one MEA 14, which includes an ion-conductive polymer electrolyte membrane, not illustrated in greater detail here, and catalytic electrodes, namely, an anode and a cathode, situated on each side thereof which catalyze the particular partial reaction of the fuel cell reaction, and which in particular may be provided as coatings on the membrane. The anode electrode and the cathode electrode include a catalytic material, for example platinum, which is present in supported form on an electrically conductive carrier material having a large specific surface, for example a carbon-based material. An anode chamber 12 is thus formed between a bipolar plate 15 and the anode, and cathode chamber 13 is formed between the cathode and next bipolar plate 15. Bipolar plates 15 are used to feed the operating media into the anode chambers and cathode chambers 12, 13, and also establish the electrical connection between individual fuel cells 11. Gas diffusion layers may optionally be situated between membrane electrode assemblies 14 and bipolar plates 15.

For supplying fuel cell stack 10 with the operating media, fuel cell system 100 includes an anode supply 20 on the one hand and a cathode supply 30 on the other hand.

Anode supply 20 includes an anode supply path 21 which is used for feeding an anode operating medium (the fuel), for example hydrogen, into anode chambers 12 of fuel cell stack 10. For this purpose, anode supply path 21 connects a fuel store 23 to an anode input of fuel cell stack 10. Anode supply 20 also includes an anode exhaust gas path 22 which discharges the anode exhaust gas from anode chambers 12 via an anode output of fuel cell stack 10. The anode operating pressure on anode sides 12 of fuel cell stack 10 is adjustable via an actuating means 24 in anode supply path 21. In addition, anode supply 20, as illustrated, may include a fuel recirculation line 25 which connects anode exhaust gas path 22 to anode supply path 21. It is customary to recirculate fuel in order to return the fuel, which is mostly used overstiochiometrically, to the stack and utilize it.

Cathode supply 30 includes a cathode supply path 31 which feeds cathode chambers 13 of fuel cell stack 10 an oxygen-containing cathode operating medium, in particular air, which is aspirated from the surroundings. Cathode supply 30 also includes a cathode exhaust gas path 32 which discharges the cathode exhaust gas (in particular the exhaust air) from cathode chambers 13 of fuel cell stack 10 and optionally supplies same to an exhaust gas system, not illustrated. For conveying and compressing the cathode operating medium, a compressor 33 is situated in cathode supply path 31. In the illustrated exemplary embodiment, compressor 33 is designed as a primarily electromotively driven compressor which is driven via an electric motor 34 which is equipped with an appropriate power electronics system 35. Compressor 33 may also be driven by a turbine 36 (optionally having a variable turbine geometry), situated in cathode exhaust gas path 32, via a shared shaft (not illustrated).

According to the illustrated specific embodiment, cathode supply 30 may also include a wastegate line 37 which connects cathode supply line 31 to cathode exhaust gas line 32, i.e., represents a bypass for fuel cell stack 10. Wastegate line 37 allows excess mass flow to be passed by fuel cell stack 10 without shutting down compressor 33. An actuating means 38 situated in wastegate line 37 is used to control the quantity of cathode operating medium which bypasses fuel cell stack 10. All actuating means 24, 26, 38 of fuel cell system 100 may be designed as regulatable or nonregulatable valves or flaps. Additional appropriate actuating means may be situated in lines 21, 22, 31, and 32 to be able to insulate fuel cell stack 10 from the surroundings.

Fuel cell system 100 also includes a humidifier 39 with an integrated water separator according to the present invention. Humidifier 39 is on the one hand situated in cathode supply path 31 in such a way that the cathode operating gas may flow through it. On the other hand, humidifier 39 is situated in cathode exhaust gas path 32 in such a way that cathode exhaust gas may flow through it. Alternatively or additionally (not illustrated), humidifier 39 may be situated in anode supply 20, in particular between anode supply path 21 and anode exhaust gas path 22.

Various further particulars of anode and cathode supply 20, 30 are not shown in simplified FIG. 1 for the sake of clarity. Thus, anode exhaust gas line 22 may open into cathode exhaust gas line 32, so that the anode exhaust gas and the cathode exhaust gas are discharged via a shared exhaust gas system.

Figure 2:
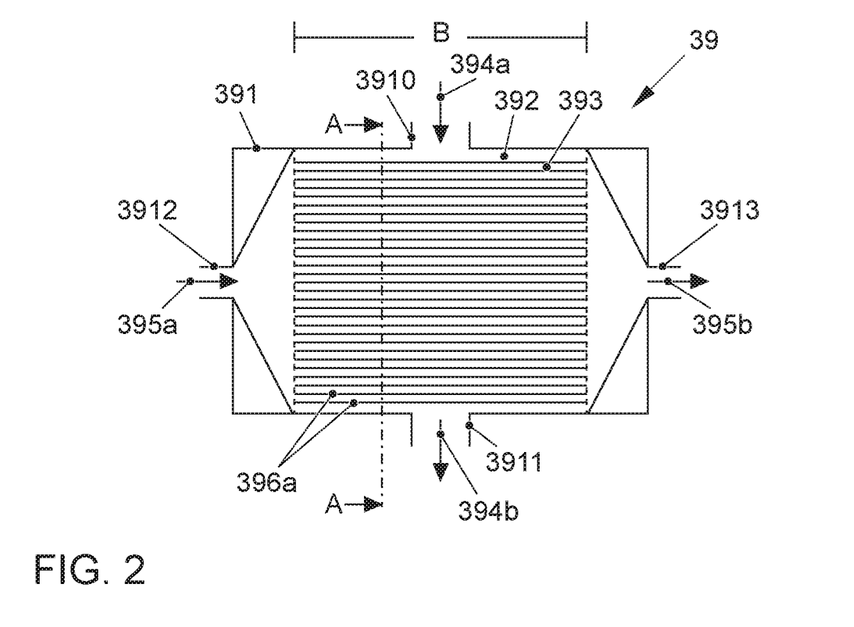
FIG. 2 shows a top view onto a humidifier with an integrated water separator according to a first exemplary embodiment of the present invention.
Figure 3:
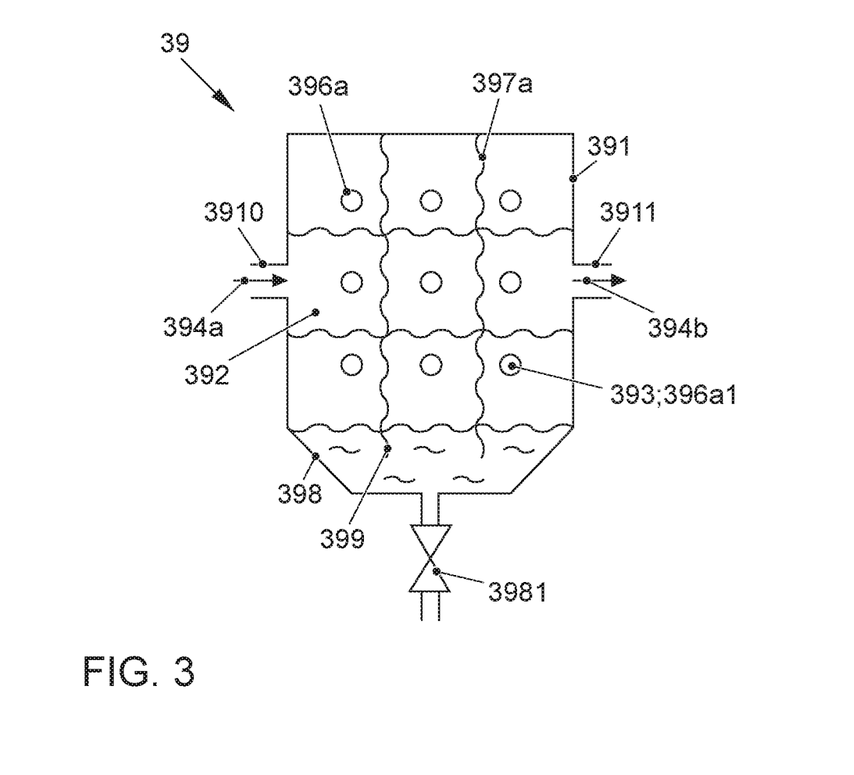
FIG. 3 shows a sectional representation of the humidifier with an integrated water separator according to the first exemplary embodiment of the present invention along section line A-A shown in FIG. 2.

FIG. 2 shows the top view onto a humidifier 39 with an integrated water separator according to a first exemplary embodiment of the present invention. FIG. 3 shows a sectional representation of humidifier 39 along section line A-A shown in FIG. 2.

Humidifier 39 according to the first exemplary embodiment includes a housing 391 with a first channel 392 for a cathode exhaust gas stream as first gas stream 394, which extends from top to bottom in the illustration in FIG. 2. First channel 392 includes a first gas supply line 3910 and a first gas discharge line 3911 which are integrated into cathode exhaust gas path 32 of fuel cell system 100. Housing 391 includes a second channel 393 for a cathode operating gas stream as second gas stream 395, which extends from left to right in the illustration in FIG. 2. Second channel 393 includes a second gas supply line 3912 and a second gas discharge line 3913 which are integrated into cathode supply path 31 of fuel cell system 100.

Housing 391 includes a humidifier area B, in which first channel 392 and second channel 393 are separated from one another by a water vapor-permeable membrane 396. In the illustrated example, membrane 396 is designed as a plurality of water vapor-permeable hollow fibers 396a situated in first channel 392. First channel 392 is thus formed as the space which surrounds hollow fibers 396a, and second channel 393 is formed as the sum of the interior spaces of hollow fibers 396a.

A moist cathode exhaust gas stream as a moist first gas stream 394a passes through first gas supply line 3910 into first channel 392, and flows around the plurality of water vapor-permeable hollow fibers 396a. A dry cathode operating gas stream as a dry second gas stream 395a passes through second gas supply line 3912 into second channel 393, which is formed in humidifier area B by hollow fiber spaces 396a of the plurality of hollow fibers 396a. In humidifier area B, moist first gas stream 394a transfers moisture to dry second gas stream 395a through water vapor-permeable hollow fibers 396a. A dry first gas stream 394b leaves first channel 392 of humidifier 39 through first gas discharge line 3911, and a moist second gas stream 395b leaves second channel 393 of humidifier 39 through second gas discharge line 3913.

A water separator 397 in the form of fibers, in particular in the form of a knitted fabric 397a, is situated in first channel 392 in humidifier area B of humidifier 39 (see FIG. 3). Knitted fabric 397a has loops through which water vapor-permeable hollow fibers 396a extend, essentially perpendicularly with respect to the plane of knitted fabric 397a. Liquid components, such as liquid droplets, contained in moist first gas stream 394a are deflected and decelerated by elements of the knitted fabric, and deposit on knitted fabric 397a. The deposited liquid water trickles along knitted fabric 397a into a collection container 398 which is connected to first channel 392 in humidifier area B, and which is formed in housing 391 and in which the deposited liquid water collects.

With the aid of a controllable discharge valve 3981, the level of the liquid water in collection container 398 is set in such a way that sufficient portions of water separator 397a are immersed in the deposited liquid water in collection container 398. Knitted fabric 397a includes a plurality of capillaries which facilitate the separation of liquid components from moist first gas stream 394a. In addition, portions of knitted fabric 397a which are immersed in the deposited liquid water in collection container 398 act as wick structures 399 due to capillarity.

The portions of knitted fabric 397a which act as wick structures 399 absorb deposited liquid water from collection container 398 and transport it upwardly against the force of gravity. Knitted fabric 397a is thus kept uniformly moist, and a portion of the water transported upwardly by wick structures 399 evaporates at water separator 397a. As a result, the water vapor partial pressure in first gas stream 394 is held essentially constant, even under fluctuating operating conditions of fuel cell stack 10. Moisture is thus constantly introduced into second gas stream 395, and fuel cell stack 10 is provided with a consistently moist cathode operating gas stream. Drying out of the ion-conductive membrane of membrane electrode assembly 14 may thus be avoided without additionally feeding water to the cathode operating gas stream during operation of fuel cell stack 10.

Figure 4:
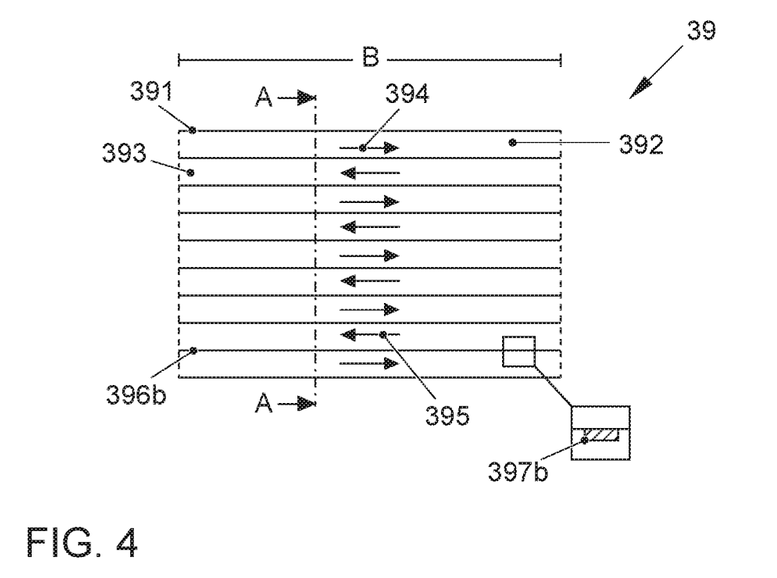
FIG. 4 shows a top view onto the humidifier area of a humidifier with an integrated water separator according to a second exemplary embodiment of the present invention.
Figure 5:
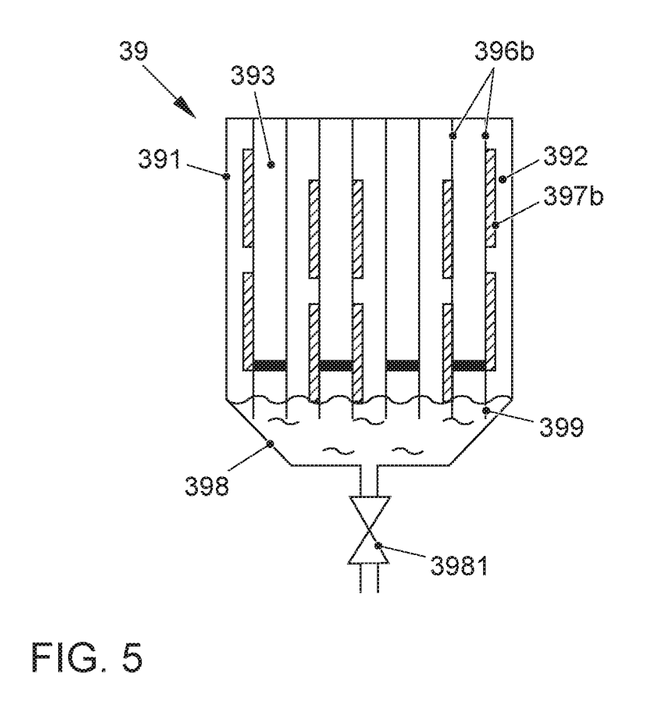
FIG. 5 shows a sectional representation of the humidifier area of the humidifier with an integrated water separator according to the second exemplary embodiment of the present invention along section line A-A shown in FIG. 4.

FIG. 4 shows the top view onto humidifier area B of a humidifier 39 with an integrated water separator according to a second exemplary embodiment of the present invention. FIG. 5 shows a sectional representation of humidifier 39 along section line A-A shown in FIG. 4. Unlike the example according to FIGS. 2 and 3, in this case the water vapor-permeable membrane is designed as a plate membrane.

Humidifier 39 according to the second exemplary embodiment includes a housing 391 with a first channel 392 for a cathode exhaust gas stream as first gas stream 394, and with a second channel 393 for a cathode operating gas stream as second gas stream 395. First channel 392 and second channel 393, similarly as for the first exemplary embodiment, are integrated into a cathode exhaust gas path 32 and a cathode supply path 31, respectively, of fuel cell system 100.

In humidifier area B of humidifier 39, first channel 392 and second channel 393 are divided by a plurality of water vapor-permeable plate membranes 396b into a plurality of first and second channels 392, 393, which in each case are separated from one another by a water vapor-permeable membrane 396b.

A moist cathode exhaust gas stream as first gas stream 394 passes into first channels 392, and a dry cathode operating gas stream as second gas stream 395 passes into second channels 393. First and second gas supply lines and first and second gas discharge lines, not illustrated, are situated on humidifier 39 in such a way that first gas streams 394 and second gas streams 395 flow past one another in opposite directions.

In humidifier area B, each first gas stream 394 transfers moisture to second gas streams 395 through water vapor-permeable plate membranes 396b which delimit the first gas streams. A water separator 397 in the form of a hydrophilic coating 397b is situated on plate membranes in each of first channels 392 in humidifier area B of humidifier 39. Coating 397b has essentially vertically extending sections, and sections which are inclined with respect to the horizontal. The inclined sections terminate at the essentially vertical sections, a groove being situated in each case at least between two of the essentially vertically situated sections. Liquid components, such as liquid droplets, contained in first gas streams 394 deposit in the grooves formed between coatings 397b, and trickle along plate membranes 396b into collection container 398. The deposited liquid water collects in collection container 398, which is connected to first channels 392 but not to second channels 393.

The level of liquid water in collection container 398 is set with the aid of a controllable discharge valve 3981 in such a way that sufficient portions of plate membranes 396b and/or of hydrophilic coating 397b applied thereto are immersed in the deposited liquid water in collection container 398. The portions of hydrophilic coating 397b that are immersed in the deposited liquid water in collection container 398 act as wick structures 399.

The portions of coating 397b which act as wick structures 399 absorb deposited liquid water from collection container 398 and transport it upwardly against the force of gravity. A portion of the water transported upwardly by wick structures 399 evaporates in first channels 392. As a result, the water vapor partial pressure in first gas stream 394 is held essentially constant, even under fluctuating operating conditions of fuel cell stack 10. Moisture is thus constantly introduced into second gas stream 395, and fuel cell stack 10 is provided with a consistently moist cathode operating gas stream. Drying out of the electrolyte of membrane electrode assembly 14 may thus be avoided without additionally feeding water to the cathode operating gas stream during operation of fuel cell stack 10.

LIST OF REFERENCE NUMERALS 100 fuel cell system
10 fuel cell stack
11 single cell
12 anode chamber
13 cathode chamber
14 membrane electrode assembly (MEA)
15 bipolar plate (separator plate, flow field plate)
20 anode supply
21 anode supply path
22 anode exhaust gas path
23 fuel tank
24 actuating means
25 fuel recirculation line
30 cathode supply
31 cathode supply path
32 cathode exhaust gas path
33 compressor
34 electric motor
35 power electronics system
36 turbine
37 wastegate line
38 actuating means
39 humidifier with integrated water separator
391 housing
392 first channel
393 second channel
394a first gas stream (moist)
394b first gas stream (dry)
395a second gas stream (dry)
395b second gas stream (moist)
B humidifier area
396 water vapor-permeable membrane
396a water vapor-permeable hollow fiber
396a1 hollow fiber space
396b water vapor-permeable plate membrane
397 water separator
397a knitted fabric/netting/mesh
397b coating
398 collection container
3981 discharge opening/controllable discharge valve
399 wick structures
3910 first gas supply line
3911 first gas discharge line
3912 second gas supply line
3913 second gas discharge line

What is claimed is:

1. A humidifier with an integrated water separator for a fuel cell system, comprising:
a housing with a first channel for a first gas stream and with a second channel for a second gas stream;
a humidifier area, the first channel and the second channel being separated from one another in the humidifier area by a water vapor-permeable membrane;
a water separator, situated in the humidifier area in one of the first and second channels to be in contact with the water vapor-permeable membrane separating the first and second channel, for separating liquid water; and a collection container for collecting the deposited liquid water, the collection container being below the first and second channels and configured such that water trickles down the water separator or the water vapor-permeable membrane into the collection container.

2. The humidifier as recited in claim 1 wherein the water separator is situated in the first channel and is configured in such a way that liquid water from the first gas stream deposits thereon; and the collection container is situated in the humidifier area and is connected to the first channel.

3. The humidifier as recited in claim 1 wherein at least one of the water separator and the water vapor-permeable membrane extends into the collection container.

4. The humidifier as recited in claim 1 wherein the water separator has a wicking effect.

5. The humidifier as recited in claim 1 further comprising wick structures situated in the first channel and extending into the collection container.

6. The humidifier as recited in claim 1 wherein the water separator is designed as at least one of the following: a knitted fabric, a netting, a mesh, a wire mesh, a wire lattice, a perforated sheet, a groove, a generator for generating a turbulent flow, a deflector, a collection pocket for droplet deposition, a labyrinth separator, and a plate separator.

7. The humidifier as recited in claim 1 wherein the membrane is at least one water vapor-permeable hollow fiber situated in the first channel, the first gas stream flowing around the at least one hollow fiber, and the at least one hollow fiber space forming the at least one second channel for the second gas stream.

8. The humidifier as recited in claim 1 wherein the water vapor-permeable membrane is at least one water vapor-permeable plate membrane and the water separator is formed by a coating on the at least one plate membrane.

9. The humidifier as recited in claim 1 wherein the water vapor-permeable membrane is at least one water vapor-permeable plate membrane and the at least one plate membrane is oriented in such a way that the deposited liquid water trickles along the at least one plate membrane into the collection container.

10. The humidifier as recited in claim 1 wherein the collection container has a discharge opening for the deposited liquid water, the discharge opening being designed as an overflow or a controllable discharge valve.

11. The humidifier as recited in claim 1 wherein the first channel includes a first gas supply line and a first gas discharge line situated in an anode or cathode exhaust gas path of a fuel cell system, and the first gas stream is an anode or cathode exhaust gas stream, and the second channel includes a second gas supply line and a second gas discharge line situated in another anode or cathode supply path of the fuel cell system, and the second gas stream is an anode or cathode operating gas stream.

12. A fuel cell system comprising:
a fuel cell stack;
an anode supply with an anode supply path for supplying an anode operating medium to the fuel cell stack, and with an anode exhaust gas path for discharging an anode exhaust gas from the fuel cell stack;
a cathode supply with a cathode supply path for supplying a cathode operating medium to the fuel cell stack, and with a cathode exhaust gas path for discharging a cathode exhaust gas from the fuel cell stack; and
the humidifier as recited in claim 1 and situated in the anode supply or the cathode supply.

13. A vehicle comprising the humidifier as recited in claim 1.

14. The humidifier as recited in claim 1 wherein the water separator is a knitted fabric.

15. The humidifier as recited in claim 14 wherein the knitted fabric is in connection with a liquid water collection container to wick the water into the knotted fabric.

16. The humidifier as recited in claim 14 wherein the knitted fabric has loops, hollow fibers of the water vapor-permeable membrane passing through the loops.

17. The humidifier as recited in claim 16 wherein the hollow fibers pass through the loops perpendicularly with respect to a plane of the knitted fabric.

18. The humidifier as recited in claim 8 wherein the coating is a hydrophilic coating.

19. The humidifier as recited in claim 8 wherein the coating has vertically extending sections.

20. The humidifier as recited in claim 19 wherein the coating has inclined section inclined with respect to a horizontal and terminating in the vertically extending sections.

* * * * *